United States Patent

Renna

Patent Number: 5,540,744
Date of Patent: Jul. 30, 1996

[54] ROOF-MOUNTED KITCHEN VENTILATOR GREASE COLLECTOR

[76] Inventor: Edward M. Renna, 3231 Drane Field Rd., Lakeland, Fla. 33811

[21] Appl. No.: 503,438

[22] Filed: Jul. 17, 1995

[51] Int. Cl.$^6$ .................................................... B01D 35/02
[52] U.S. Cl. .......................... 55/323; 55/486; 55/350.1; 55/511; 55/DIG. 36; 126/299 R; 454/49
[58] Field of Search .......................... 126/299 R, 299 D, 126/299 E, 299 F; 55/323, 350.1, 486, 511, DIG. 36; 454/49; 210/489, 538–540

[56] References Cited

U.S. PATENT DOCUMENTS 4,887,588  12/1989  Rial ...................................... 126/299 R
5,196,040   3/1993  Malloy et al. ....................... 126/299 R

*Primary Examiner*—James C. Yeung
*Attorney, Agent, or Firm*—George A. Bode; Daniel E. Maddux

[57] ABSTRACT

An apparatus for collecting grease from a kitchen ventilator, which is mounted on the roof of a structure housing a restaurant. The apparatus fits around the exhaust fan of a kitchen ventilator and includes at least one layer of filtering medium which fits snugly about the exhaust fan, a rectangular frame for securing the layer of filtering medium about the exhaust fan, and a plurality of retaining bars for securing the layer of filter medium in the rectangular frame. The rectangular frame is comprised of four frame sections joined at each end with 90° elbows. Each frame section comprises three tubes with supports fitted between the tubes. The 90° elbows fit over and join the tubes of one frame section with the tubes of another frame section. The retaining bars are positioned between two tubes of opposing frame sections, above the layer of filtering medium. The apparatus includes four retaining bars: a pair of which snugly abut the exhaust fan to prevent any movement of the apparatus relative to the exhaust fan during use; and, each of the remainder of which are positioned between one of the pair and one of the non-opposing frame sections to secure the ends of the layer of filtering medium in the frame. Should parts of a frame section be cut out to accommodate an obstruction, reinforcement supports can be fitted between the tubes of the cut-out frame section and adjacent to the obstruction to reinforce the cut-out frame section. The frame of the apparatus can be expanded in two ways to cover and protect a greater area of the roof from grease expelled from the exhaust fan.

13 Claims, 3 Drawing Sheets

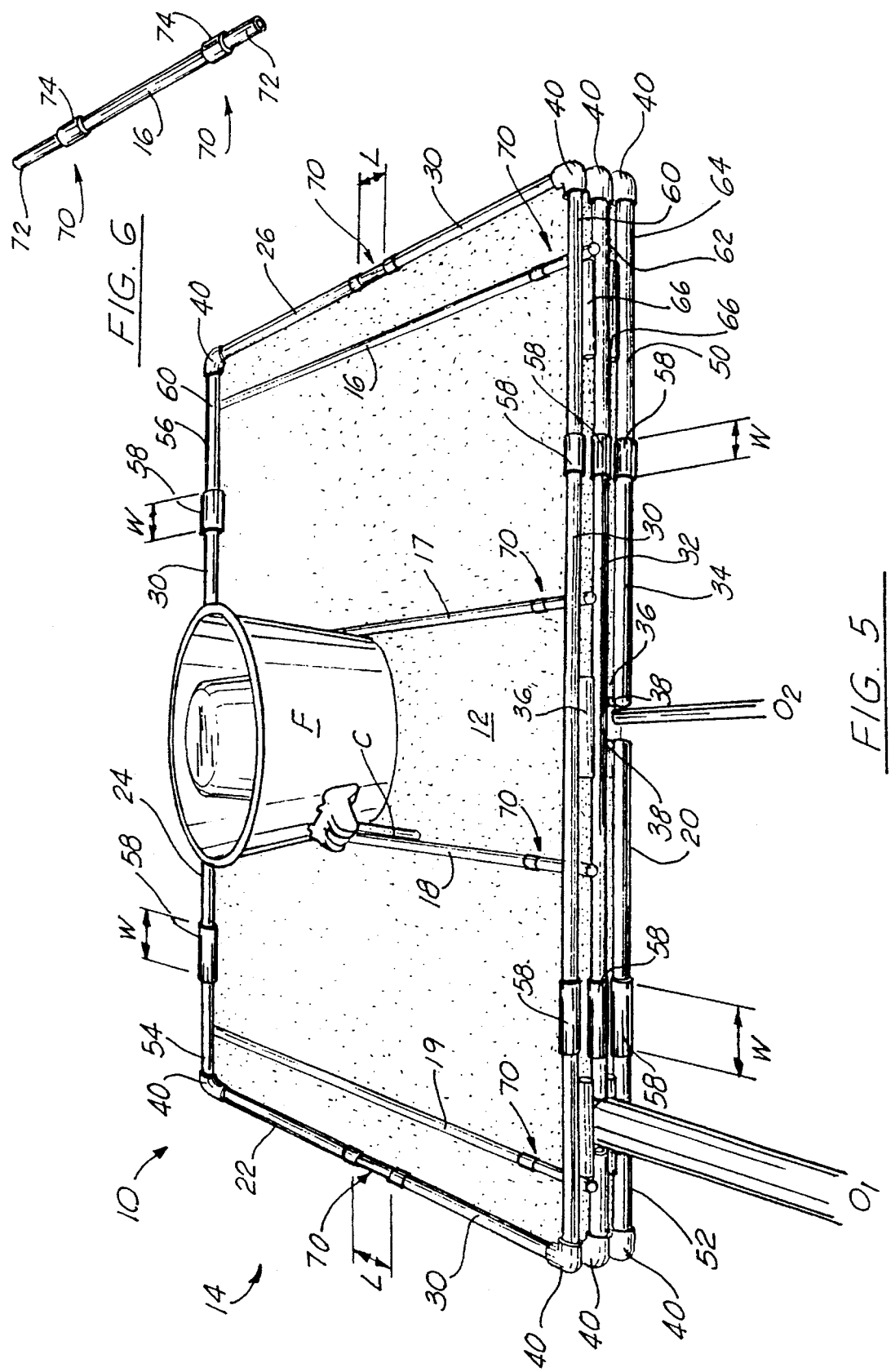

ROOF-MOUNTED KITCHEN VENTILATOR GREASE COLLECTOR

BACKGROUND OF THE INVENTION

1. Field of the Invention

The present invention relates to an apparatus for collecting grease expelled from a kitchen ventilator, particularly an apparatus for collecting grease expelled from a kitchen exhaust fan of a kitchen ventilator onto the roof of a building housing a restaurant and its kitchen.

2. General Background

Restaurants require a sizable kitchen for cooking. In the process of cooking food for customers, the kitchen generates a large amount of grease. Some of this grease is removed from the kitchen through the kitchen ventilator and expelled through the kitchen exhaust fan of the kitchen ventilator onto the roof of the building housing the restaurant. Accumulation of grease on the roof of the restaurant causes bacteria buildup, fire hazards, pollution, safety hazards, and damage to the roof. Accumulation of grease on the roof of the restaurant may also violate local health and fire department codes, including NFPA 96.

Several devices have been patented which are aimed at preventing grease from accumulating on the roof of a restaurant.

U.S. Pat. No. 2,494,146 issued to P. A. Spanos and entitled "Grease Trapping Device" teaches an inverted cone-shaped grease trapping device 7 that directs excess grease to a central vent pipe 5.

U.S. Pat. No. 4,987,882 issued to Renco Systems, Inc., on the application of A. S. Kaufman and entitled "Roof Mounted Kitchen Hood Grease Exhaust Blowers" discloses a roof-mounted ventilator 10 that extracts grease and deflects it horizontally to a container 66 via discharge scoop 54.

U.S. Pat. No. 2,889,007 issued to K. E. Lunde and entitled "Grease Extracting Ventilator For Kitchen Ranges" discloses a Grease extracting ventilation unit 15 that directs the grease into a trough.

Other patents present in the art are U.S. Pat. No. 3,364,664 issued to D. H. Doane and entitled "Grease Extractor For Ventilating Systems"; U.S. Pat. No. 3,911,895 issued to Cylpik, Inc., on the application of Q. H. Van Schoyck and entitled "Method And Apparatus For Removing Grease From Within An Exhaust System"; U.S. Pat. No. 4,811,724 issued to Halton Oy on the application of E. Aalto, et. al., and entitled "Air Exhausting Means"; U.S. Pat. No. 3,425,334 issued to R. E. Brown, et. al., and entitled "Heat Arresting Grease Extracting Filter Assembly"; and U.S. Pat. No. 2,862,437 issued to G. O. Smith, et. al., and entitled "Ventilating Device", all of which are directed to grease trap filters for ventilation systems and are representative of the state of the art, but do not meet the needs of the apparatus of the present invention.

The Spanos '146 patent relates to a grease trap filter which prevents grease from entering the kitchen ventilator; it does not teach collecting grease that is expelled from the kitchen ventilator through the kitchen exhaust fan onto the roof of the building.

The Kaufman '882 patent teaches directing grease that is expelled from the kitchen exhaust fan to a container. However, the container and the means to direct the grease to the container are not expandable to accommodate a larger amount of grease. Furthermore, the apparatus taught in Kaufman is relatively complex to manufacture and difficult to service and clean.

The Lunde '007 patent teaches directing grease from the kitchen ventilator to a container. However, the apparatus of Lunde collects the grease from the kitchen before the grease reaches the kitchen exhaust fan. Also, Lunde does not teach the problem of the kitchen exhaust fan expelling grease onto the roof of the building. Furthermore, the apparatus taught by Lunde is relatively complex to manufacture and difficult to service and clean.

The Van Schoyck '895 patent teaches placing a removable liner on the inside of the kitchen ventilator to collect grease removed from the kitchen. The Van Schoyck patent does not teach the problem of the kitchen exhaust fan expelling grease onto the roof of the building. Furthermore, the apparatus taught by Van Schoyck is relatively difficult to install and remove.

The remaining prior art patents teach grease filter traps which prevent grease from entering the kitchen ventilator similar to the Spanos '146 patent. They do not teach collecting grease that is expelled from the kitchen ventilator through the kitchen exhaust fan onto the roof of the building. Furthermore, the devices taught in these patents are relatively complex to manufacture and difficult to service and clean.

Accordingly, a need exists for an apparatus that collects grease expelled from the kitchen exhaust fan of a kitchen ventilator onto the roof of a restaurant that is simple in design and easy and inexpensive to manufacture.

Furthermore, a need exists for an apparatus that collects grease expelled from the kitchen exhaust fan of a kitchen ventilator onto the roof of a restaurant that is readily installed and easily removable for inspection, servicing and routine cleaning.

Also, a need exists for an apparatus that collects grease expelled from the kitchen exhaust fan of a kitchen ventilator onto the roof of a restaurant that is expandable to cover and protect a greater area of the roof and to collect more Grease expelled from the kitchen exhaust fan.

SUMMARY OF THE PRESENT INVENTION

The preferred embodiment of the apparatus of the present invention solves the aforementioned problems in a straightforward and simple manner. What is provided is an apparatus for collecting grease that is expelled from a kitchen exhaust fan of a kitchen ventilator onto the roof of a building housing a restaurant. The apparatus is designed to fit around a kitchen exhaust fan extending through the roof of a building housing a restaurant. The kitchen exhaust fan has an electrical cord extending from it to a source of power.

The apparatus of the present invention includes a layers of filter media, a rectangular frame for holding the filter media, and a plurality of retaining bars for securing the filter media in the frame. The filter media is fitted around the kitchen exhaust fan. The filter media has two holes cut in it so that the kitchen exhaust fan and the electrical cord can fit through the filter media.

The frame fits around the layers of filter media and holds the layers of filter media in place around the kitchen exhaust fan.

The plurality of retaining bars hold the layers of filter media in the frame. The retaining bars are positioned in the frame such that two of the retaining bars snugly secure the kitchen exhaust fan to prevent any movement of the apparatus relative to the ventilator.

In operation grease is expelled from the kitchen ventilator through the kitchen exhaust fan onto the roof of the building. The expelled grease falls onto the filter media of the apparatus. The filter media prevents the grease from falling and/or accumulating on the roof of the building. The frame and retaining bars of the apparatus hold the filter media in place.

In view of the above, it is an object of the present invention to provide an apparatus that collects grease expelled from the kitchen exhaust fan of a kitchen ventilator onto the roof of a restaurant that is simple in design and easy and inexpensive to manufacture.

It is a further object of the present invention to provide such an apparatus that collects grease expelled from the kitchen exhaust fan of a kitchen ventilator onto the roof of a restaurant that is readily installed and easily removable for inspection, servicing and routine cleaning.

In view of the above objects it is a feature of the present invention to provide an apparatus that collects grease expelled from the kitchen exhaust fan of a kitchen ventilator onto the roof of a restaurant that is expandable to cover and protect a greater area of the roof and to collect more grease expelled from the kitchen exhaust fan.

It is another feature of the present invention to provide an apparatus that collects grease expelled from the kitchen exhaust fan of a kitchen ventilator onto the roof of a restaurant which substantially reduces and/or prevents the fire hazards, bacteria buildup, pollution, safety hazards and damage to the roof resulting from the accumulation of grease on the roof caused by a kitchen ventilator expelling grease onto the roof.

A further object of the present invention is to provide an apparatus that collects grease expelled from the kitchen exhaust fan of a kitchen ventilator onto the roof of a restaurant which improves a restaurant's compliance with local health and fire department codes, including NFPA 96.

BRIEF DESCRIPTION OF THE DRAWING

For a further understanding of the nature and objects of the present invention, reference should be had to the following description taken in conjunction with the accompanying drawing in which like parts are given like reference numerals and, wherein:

FIG. 5 is a perspective view of the preferred embodiment of the apparatus of the present invention showing how the frame can be expanded to cover and protect a greater area of the roof of a structure housing a restaurant from grease expelled from the kitchen exhaust fan; and FIG. 6 is a perspective view illustrating the retaining bar expansion sections of the present invention.

DETAILED DESCRIPTION OF THE PREFERRED EMBODIMENT

Figure 1:
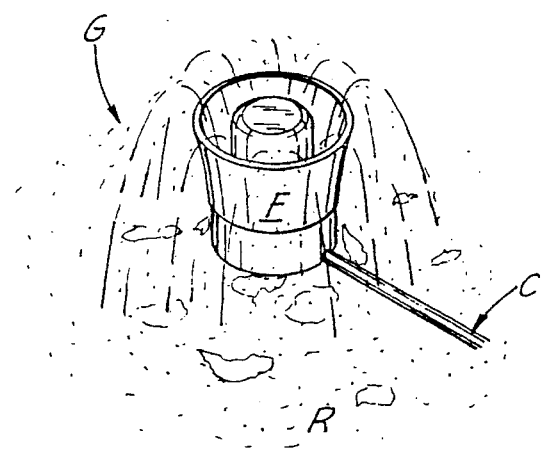
FIG. 1 is a perspective view of a kitchen exhaust fan expelling grease onto a roof of a structure housing a restaurant.

Referring now to the drawing, FIG. 1 illustrates a kitchen ventilator of the prior art. A kitchen exhaust fan F of a kitchen ventilator (not shown) is mounted on the roof R of a structure housing a restaurant (not shown). An electrical cord C extends from kitchen exhaust fan F to a source of electrical power. Grease G from the kitchen of the restaurant is removed through the kitchen ventilator and expelled from kitchen exhaust fan F onto roof R, accumulating and causing fire hazards, bacteria buildup, pollution, safety hazards and damage to the roof.

Figure 3:
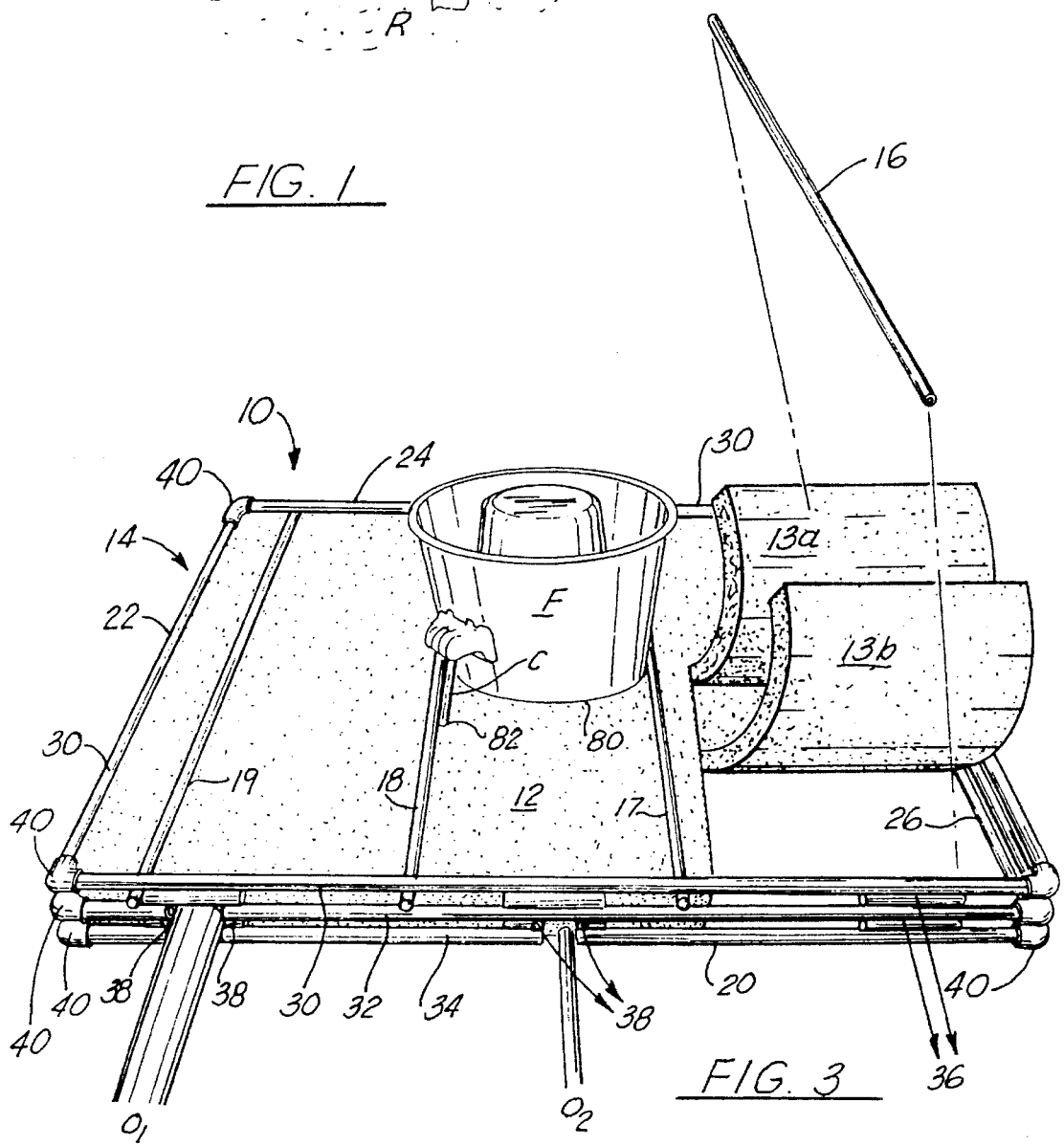
FIG. 3 is a perspective view of the preferred embodiment of the present invention, showing the apparatus mounted around a kitchen exhaust fan, with the filter media cut away to show two layers and further showing how the apparatus can accommodate two obstructions and how the retaining bars of the present invention are mounted on the frame.
Figure 4:
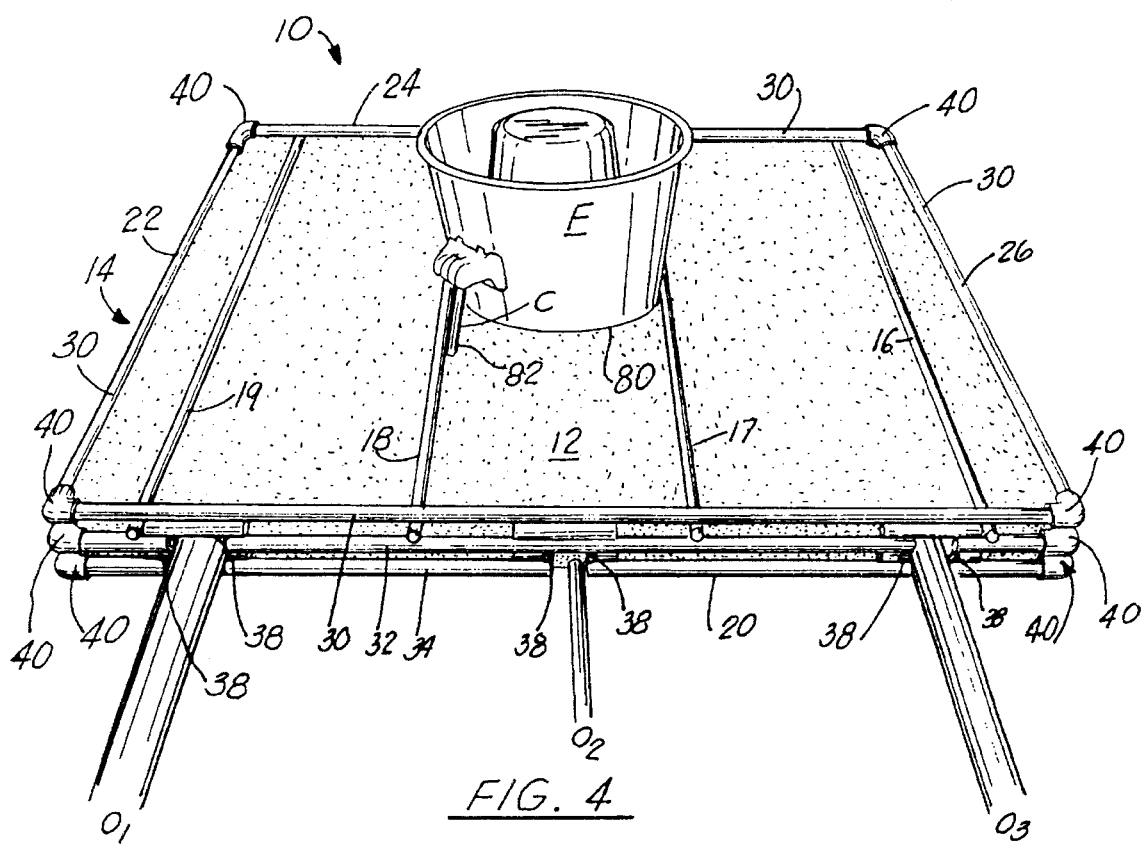
FIG. 4 is a perspective view of the embodiment of FIG. 3, showing the assembled apparatus and how the apparatus can accommodate three obstructions.

Referring now to FIG. 4, the apparatus of the present invention is designated generally by the numeral 10. Apparatus 10 is generally comprised of layers 13 of filter media 12, a rectangular frame 14, and a plurality of elongated longitudinal retaining bars 16, 17, 18 and 19. Filter media 12 is fitted around kitchen exhaust fan F. Filter media 12 has two vertical holes 80, 82 cut in it so that kitchen exhaust fan F and electrical cord C, respectively, can fit through filter media 12. Filter media 12 is also cut to size to fit in frame 14. Two (2) or more layers 13 of filter media 12 can be fitted around kitchen exhaust fan F and electrical cord C, depending on the amount of grease accumulated or the frequency of changes of filter media 12. Preferably, two (2) layers 13a, 13b of filter media 12 are used in apparatus 10, as best seen in FIG. 3. Layers 13a, 13b of filter media 12 are preferably two (2") inch thick polyester filter media available in various lengths and widths.

Figure 2:
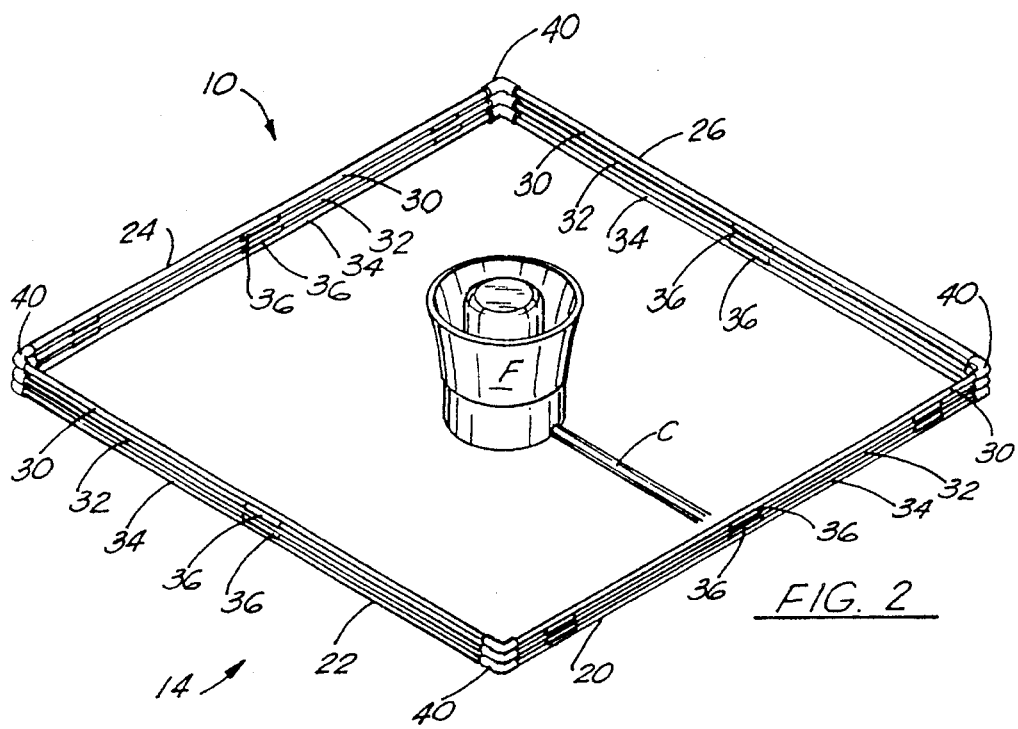
FIG. 2 is a perspective view of the frame of the present invention positioned around a kitchen exhaust fan.

Rectangular frame 14 fits around layers 13a, 13b of filter media 12 and holds these layers of filter media 12 in place around kitchen exhaust fan F. Referring to FIG. 2, frame 14 is more clearly seen. Frame 14 includes four frame sections 20, 22, 24 and 26. Frame sections 20, 22, 24 and 26 each include three tubes 30, 32 and 34 with pipe nipples 36 fitted between tubes 30 and 32 and 32 and 34 for support. Frame sections 20, 22, 24 and 26 are joined at their respective ends with 90° elbows 40 such that frame section 20 is connected to frame section 22, which is connected to frame section 24, which is connected to frame section 26, which in turn is connected to frame section 20 to form the square shaped frame 14. Elbows 40 fit over the ends of tubes 30, 32 and 34 of respective frame sections 20, 22, 24 and 26. Preferably, frame sections 20, 22, 24 and 26 are each five (5') feet long and five (5") inches high. Tubes 30, 32 and 34 are preferably each five (5') feet long and ¾ inch in diameter. Pipe nipples 36 are preferably ½ inch in diameter. Frame 14 is preferably made of PVC.

Referring again to FIG. 4, longitudinal retaining bars 16, 17, 18 and 19 hold layers 13 of filter media 12 in frame 14. Retaining bars 16, 17, 18 and 19 are longitudinally positioned in frame 14 such that two of the retaining bars 17 and 18 snugly tangentially abut circular kitchen exhaust fan F on opposing points along the perimeter thereof to prevent any movement of apparatus 10 relative to fan F (it should be obvious that fan F will vibrate during use causing vibration of apparatus 10). The end portions of longitudinal retaining bars 16, 17, 18 and 19 are positioned in frame 14 between tubes 30 and 32 of opposing transverse frame sections 20 and 24, respectively. Preferably, apparatus 10 has four such longitudinal retaining bars: one pair or the two retaining bars 17 and 18 are positioned tangentially against kitchen exhaust fan F; and, the other two retaining bars 16 and 19 are positioned about four (4") inches from opposing longitudinal frame sections 26 and 22, respectively, to secure the ends of filter media 12 in frame 14. Retaining bars 16, 17, 18 and 19 are preferably five (5') feet three inches long. Retaining bars 16, 17, 18 and 19 are preferably made of PVC.

Referring to FIG. 5, frame 14 of apparatus 10 can be expanded in two different ways to cover and protect a greater area of the roof of a structure housing a restaurant from grease expelled from kitchen exhaust fan F. The length and/or width of frame 14 can be expanded, as indicated by ARROWS L and W, respectively. One way of expanding frame 14 is to add expander sections between the ends of a frame section and 90° elbows 40. For example, in FIG. 5 expansion sections 50 and 52 have been added to frame section 20 (of FIG. 4), and expansion sections 54 and 58 have been added to frame section 24 (of FIG. 4) to expand the width of frame 14. Expansion sections 50, 52, 54 and 56 are each constructed similar to frame sections 20, 22, 24, 26; they each have tubes 60, 62 and 64 with pipe nipples 66 fitted therebetween. Expansion sections 50, 52, 54 and 56 further each have couplers 58 mounted on one end of tubes 60, 62 and 64 for connection to tubes 30, 32, 34, respectively. Couplers 58 join tubes 60, 62 and 64 of expansion sections 50 and 52 with tubes 30, 32 and 34, respectively, of frame section 20. Couplers 58 also join tubes 60, 62 and 64 of expansion sections 54 and 56 with tubes 30, 32 and 34 of frame section 24. Couplers 58 telescopically fit over tubes 60, 62, and 64 of expansion sections 50, 52, 54 and 56 and over tubes 30, 32 and 34, respectively, of frame sections 20 and 24. Thus, one end of expansion section 50 couples to transverse frame section 20 and the other end couples to longitudinal frame section 26 via elbows 40. One end of expansion section 52 couples with transverse frame section 20 and the other end couples to longitudinal frame section 22 via elbows 40. One end of expansion section 54 couples to transverse frame section 24 and the other end couples to longitudinal frame section 22 via elbows 40. One end of expansion section 56 couples to transverse frame section 24 and the other end couples to longitudinal frame section 26 via elbows 40.

Another way of expanding frame 14 of apparatus 10 is to cut a frame section in half and insert a retro-fit expansion section between the cut frame section. Referring to FIG. 5, transverse frame sections 20 and 24 represent retro-fit expansion sections and frame sections 50, 52, 54 and 56, respectively, represent cut frame sections. Retro-fit expansion sections 20 and 24 are the same as expansion sections 50, 52, 54 and 56 described in the above paragraph, except that retro-fit expansion sections 20 and 24 have couplers 58 on both ends of tubes 30, 32 and 34. Couplers 58 join tubes 30, 32 and 34 of retro-fit expansion section 20 to tubes 60, 62 and 64, respectively, of cut frame sections 50 and 52. Likewise, couplers 58 join tubes 30, 32 and 34 of retro-fit expansion section 24 to tubes 60, 62 and 64, respectively, of cut frame sections 54 and 56.

Preferably, expansion sections 50, 52, 54 and 56 and retro-fit sections 20 and 24 are either two (2') feet or four (4') feet long and are made of PVC. Tubes 60, 62 and 64 of expansion sections 50, 52, 54 and 56 and tubes 30, 32 and 34 of retro-fit expansion sections 20 and 24 are preferably ¾ inch in diameter. Pipe nipples 66 of expansion sections 50, 52, 54 and 56 and pipe nipples 36 of retro-fit expansion sections 20 and 24 are preferably ½ inch in diameter. Couplers 58 of expansion sections 50, 52, 54 and 56 and of retro-fit expansion sections 20 and 24 are preferably ¾ inch in diameter. When expanding the length of frame 14, as indicated by ARROW L in FIG. 5, retaining bar extension sections 70, seen in detail in FIG. 6, are added to retaining bars 16, 17, 18 and 19. Retaining bar expansion sections 70 include expansion bars 72 and couplers 74. Couplers 74 telescopically fit over and join either or both ends of retaining bars 16, 17, 18 and 19 to expansion bars 72.

Parts of frame sections 20, 22, 24 and 26 of frame 14 may be cut away so that apparatus 10 can accommodate obstructions. Referring to FIGS. 3–5, and in particular FIG. 4, parts of frame section 20 can be seen cut away to accommodate obstructions $O_1$, $O_2$ and $O_3$. Reinforcement pipe nipples 38 are fitted adjacent to obstructions $O_1$, $O_2$ and $O_3$ and between tubes 32 and 34 of frame section 20 to reinforce tubes 32 and 34. Reinforcement pipe nipples 38 are preferably six (6") inches long and ½ inch in diameter. Furthermore, reinforcement pipe nipples 38 are preferably made of PVC.

Apparatus 10 can be constructed around kitchen exhaust fan F and electrical cord C or built first and then fitted around kitchen exhaust fan F and electrical cord C. Frame sections 20, 22, 24 and 26 are joined together by applying PVC glue to both ends of tubes 30, 32 and 34 of frame sections 20, 22, 24 and 26 and inserting the ends into couplers 40. Thus, transverse frame section 20 is joined to longitudinal frame section 22, which is joined to transverse frame section 24, which is joined to longitudinal frame section 26, which in turn is joined to transverse frame section 20, to form a square shaped frame 14, as best seen in FIG. 2. Frame 14 is then positioned around kitchen exhaust fan F. Layers 13 of filter media 12 are then cut to size to fit into frame 14. Two holes 80, 82 are then cut into layers 13 of filter media 12 to fit kitchen exhaust fan F and electrical cord C. Layers 13 of filter media 12 are then fitted snugly around kitchen exhaust fan F and electrical cord C in frame 14. Retaining bars 16, 17, 18 and 19 are then inserted into frame 14 on top of layers 13 of filter media 12 such that longitudinal retaining bars 16, 17, 18 and 19 fit between tubes 30 and 32 of opposing transverse frame sections 20 and 24. Retaining bars 16, 17, 18 and 19 compress layers 13 of filter media 12 and keep these layers in place. The two interior retaining bars 17 and 18 are firmly positioned tangentially against opposite points of kitchen exhaust fan F to prevent any shifting of apparatus 10. Two more retaining bars, anterior retaining bars 16 and 19, are positioned about four (4") inches from opposing longitudinal frame sections 26 and 22, respectively, to secure the ends of layers 13 of filter media 12 in frame 14.

In operation grease G is expelled from the kitchen ventilator through kitchen exhaust fan F onto the roof of the building. The expelled grease G falls onto layers 13 of filter media 12 of apparatus 10. These layers of filter media 12 prevent the grease from falling and/or accumulating on the roof of the restaurant. Frame 14 and retaining bars 16, 17, 18 and 19 of apparatus 10 hold filter media 12 in place. To remove layers 13 of filter media 12 for cleaning or replacing, retaining bars 16, 17, 18 and 19 are simply removed from frame 14 and layers 13 are taken out. Layers 13 should be changed every four to six weeks, depending on the severity of the grease problem.

As can be seen from the above description, the apparatus of the present invention is very simple in design and easy and inexpensive to manufacture, consisting of only three major parts: filter media 12, frame 14, and retaining bars 16, 17, 18 and 19. Furthermore, the apparatus of the present invention is readily installed and easily removable for inspection, servicing and routine cleaning.

The apparatus of the present invention is expandable to cover and protect a greater area of the roof and to collect more grease expelled from the kitchen exhaust fan, making the apparatus more versatile and adaptable to various restaurants and buildings.

Also, as the above description makes clear, the apparatus of the present invention substantially reduces and/or prevents the fire hazards, bacteria buildup, pollution, safety hazards and damage to the roof resulting from the accumulation of grease on the roof caused by a kitchen ventilator expelling grease onto the roof by preventing the grease from falling onto the roof. As a result, the apparatus of the present invention improves a restaurant's compliance with local health and fire department codes, including NFPA 96.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. An apparatus for collecting grease expelled from the exhaust fan of a kitchen ventilator, the exhaust fan having an electrical cord to a source of power and being mounted on the roof of a structure housing a restaurant, the apparatus comprising:
   (a) a filtering medium fitted about said exhaust fan, said filtering medium having therein means for allowing said exhaust fan to pass therethrough;
   (b) a frame for containing and securing said filtering medium about said exhaust fan, wherein said frame is substantially rectangular and comprises four frame sections joined to each other with 90° elbows, each of said frame sections including three horizontally stacked tubes and support means positioned between each pair of said tubes; and,
   (c) a plurality of elongated retaining bars secured in said frame between two of said horizontally stacked tubes in opposing frame sections and above said filtering medium to secure said filtering medium in said frame, a pair of said retaining bars being positioned so as to abut said exhaust fan on opposing sides thereof to thereby prevent movement of said apparatus relative to said exhaust fan.

2. The apparatus of claim 1, wherein means for allowing said exhaust fan to pass through said filtering medium comprises an aperture centrally located in said filtering medium.

3. The apparatus of claim 1, wherein one of said retaining bars is positioned between one of said pair of retaining bars and one of said frame sections.

4. The apparatus of claim 1, wherein said frame and said retaining bars are made of PVC.

5. The apparatus of claim 1, wherein said filtering medium is of a polyester material.

6. The apparatus of claim 1, further comprising:
   (a) expansion sections for expanding the width and/or length of said frame, said expansion sections being inserted between said frame sections and said 90° elbows, each of said expansion sections including three horizontally stacked tubes, support means positioned between said tubes, and couplers mounted on one end of said tubes such that said tubes of said expansion sections can be coupled to said tubes of said frame sections, said 90° elbows coupling the other end of said tubes of said expansion sections to said tubes of said frame sections; and,
   (b) retaining bar expansion sections for extending the length of said retaining bars, said retaining bar expansion sections including expansion bars and couplers for coupling said expansion bars to either or both ends of said retaining bars.

7. The apparatus of claim 6, wherein at least one of said frame sections is cut in half, and further comprising:
   (a) retro-fit expansion sections for expanding the width and/or length of said frame, said retro-fit expansion sections being inserted between said cut frame sections, each of said retro-fit expansion sections including three horizontally stacked tubes, support means positioned between said tubes, and couplers mounted on both ends of said tubes, whereby said tubes of said expansion section can be coupled to said tubes of said cut frame sections; and,
   (b) retaining bar expansion sections for extending the length of said retaining bars, said retaining bar expansion sections including expansion bars and couplers for coupling said expansion bars to either or both ends of said retaining bars.

8. The apparatus of claim 1, wherein at least one part of at least one said frame sections has been cut out to accommodate at least one obstruction to said apparatus, the apparatus further comprising reinforcement means for supporting said obstruction positioned around the cut out part of said frame section and adjacent to the obstruction.

9. An apparatus for collecting grease expelled from the exhaust fan of a kitchen ventilator, the exhaust fan having an electrical cord to a source of power and being mounted on the roof of a structure housing a restaurant, the apparatus comprising:
   (a) a filtering medium fitted about said exhaust fan, said filtering medium having a centrally located aperture therein for allowing said exhaust fan to pass therethrough;
   (b) a substantially rectangular frame for containing and securing said filtering medium about said exhaust fan, said rectangular frame comprising four frame sections joined to each other with 90° elbows, each of said frame sections including three horizontally stacked tubes; and,
   (c) a plurality of elongated retaining bars removably secured in said frame between two of said horizontally stacked tubes in opposing frame sections and above said filtering medium to secure said filtering medium in said frame, said retaining bars being positioned in said frame sections in opposing sides of said frame, a pair of said retaining bars being positioned to abut said exhaust fan on opposing sides thereof to prevent movement of said apparatus relative to said exhaust fan and the remainder of said retaining bars being positioned in said opposing frame sections between one of said pair of retaining bars and one of said non-opposing frame sections.

10. An apparatus for collecting grease expelled from the exhaust fan of a kitchen ventilator, the exhaust fan having an electrical cord to a source of power and being mounted on the roof of a structure housing a restaurant, the apparatus comprising:
   (a) a filtering medium fitted about said exhaust fan, said filtering medium having centrally located apertures therein for allowing said exhaust fan and electrical cord to pass therethrough;
   (b) a substantially rectangular frame for containing and securing said filtering medium about said exhaust fan, said rectangular frame further comprising four frame sections joined to each other with 90° elbows, each of said frame sections including three horizontally stacked tubes and support means positioned between said tubes, said 90° elbows fitting over said tubes of said frame sections; and at least four elongated retaining bars removably positioned in said frame above said filtering medium such that said retaining bars are inserted between two of said tubes in said frame sections on opposing sides of said frame; a pair of said retaining bars positioned to abut said exhaust fan on opposing sides thereof to prevent movement of said apparatus relative to said exhaust fan and each of said remainder of said retaining bars being positioned in said opposing frame sections between one of said pair of retaining bars.

11. The apparatus of claim 9, further comprising:

(a) expansion sections for expanding the width and/or length of said frame, said expansion sections being inserted between said frame sections and said 90° elbows, each of said expansion sections including three tubes, support means positioned between said tubes, and couplers mounted on one end of said tubes such that said tubes of said expansion section can be coupled to said tubes of said frame section, said 90° elbows coupling the other end of said tubes of said expansion sections to said tubes of said frame sections; and, (b) retaining bar expansion sections for extending the length of said retaining bars, said retaining bar expansion sections including expansion bars and couplers for coupling said expansion bars to either or both ends of said retaining bars.

12. The apparatus of claim 10, wherein at least one of said frame sections is cut in half, and further comprising:

(a) retro-fit expansion sections for expanding the width and/or length of said frame, said retro-fit expansion sections being inserted between said cut frame sections, each of said retro-fit expansion sections including three tubes, support means positioned between said tubes, and couplers mounted on both ends of said tubes such that said tubes of said expansion section can be coupled to said tubes of said cut frame sections; and, (b) retaining bar expansion sections for extending the length of said retaining bars, said retaining bar expansion sections including expansion bars and couplers for coupling said expansion bars to either or both ends of said retaining bars.

13. The apparatus of claim 10, wherein at least one part of at least one of said frame sections has been cut out to accommodate at least one obstruction to said apparatus, the apparatus further comprising support means positioned around the cut-out part of said frame section and adjacent to said obstruction.

* * * * *